(No Model.)
E. THOMSON.
LIGHTNING ARRESTER.
No. 508,648. Patented Nov. 14, 1893.
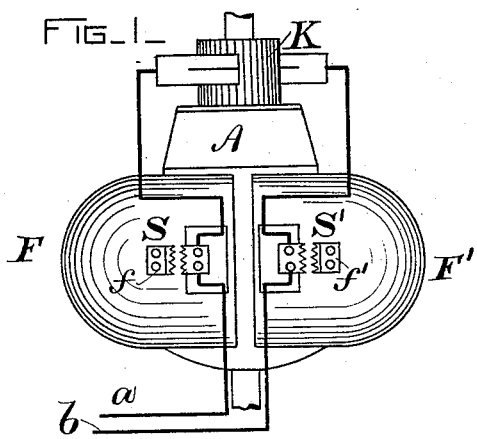
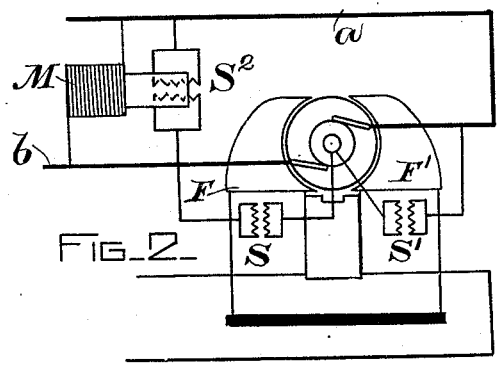
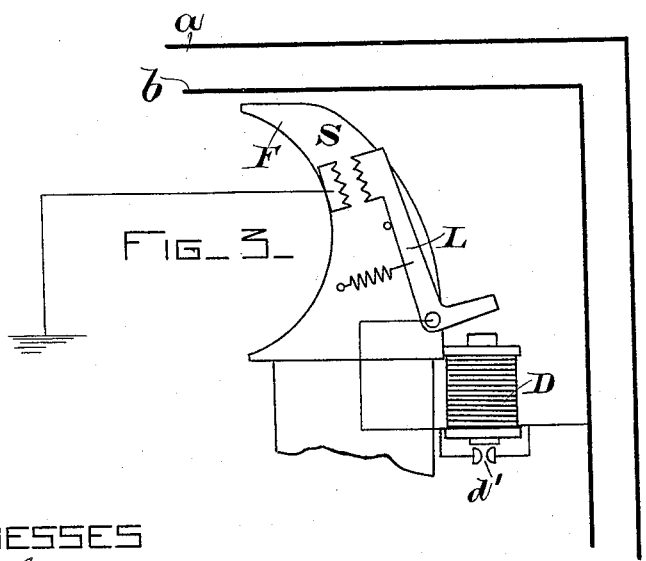
WITNESSES
INVENTOR
Elihu Thomson,
By Bentley & Blodgett
Attys.

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

LIGHTNING-ARRESTER.

SPECIFICATION forming part of Letters Patent No. 508,648, dated November 14, 1893.

Application filed August 26, 1891. Serial No. 403,754. (No model.)

*To all whom it may concern:*

Be it known that I, ELIHU THOMSON, of Swampscott, in the county of Essex and State of Massachusetts, have invented a certain new and useful Improvement in Lightning-Discharge Protectors for Electric Apparatus, of which the following is a specification.

My present invention relates to means whereby dynamo electric machines, motors, and such like apparatus, are protected from injurious actions due to static discharges delivered to them by the connecting wires or lines which they supply, or by which they are supplied, such static discharges having their origin in lightning induction or direct communication of lightning discharges to the line.

My invention consists in putting the various parts of the apparatus in communication through spark gaps, so that when a discharge of high potential reaches the apparatus it will be communicated through such spark gaps to all parts of the apparatus—thus preventing any great difference of potential between such parts such as would give rise to puncturing of the intervening insulation, such spark gaps being located in the magnetic field of the apparatus to prevent the formation or continuance of arcs at such gaps.

In the accompanying drawings, Figure 1 is a plan view of an apparatus embodying my invention. Figs. 2 and 3 show modifications.

A represents the armature and F the field magnet of a dynamo, each of which as usual has windings or coils connected to the supply circuit $a$ $b$ and insulated in a suitable manner from their respective cores. Such insulation, however, while sufficient for the working electromotive force or potential of the apparatus, is liable to give way before the enormous differences of potential set up between the winding and core on the passage of a lightning discharge, or one induced thereby through the supply circuit to the winding or coils. The insulation having thus been pierced, the working potential of the apparatus is usually sufficient to maintain an arc, shortcircuiting and damaging the machine, and requiring the unwinding and rewinding thereof. To avoid this result, I provide what may be termed an alternative path I from the line to the core—such path including a spark gap or space S of very high resistance and low self induction. This virtually constitutes a weak spot in the insulation between the line and core, so that a high tension discharge will pass through this path rather than through the coil insulation. The self induction of the windings also conduces to this effect. Such a discharge path is preferably provided for each side of the line to the core of the machine, and each path has a separate gap, S or S'. It is essential, however, that means be provided for extinguishing the arcs formed at the gaps when the discharge takes place. This may be accomplished by the lever L, Fig. 3, movable under the influence of a magnet D, but I also avail myself of the magnetic effect of the free field of the field magnets, and to. this end the discharge spaces are located adjacent to the field magnets as shown.

In Fig. 1 I have shown a disposition, in which the wires leading from the commutator K have spark plates and spark gaps as at S, S', the plates being insulated from each other and from the field magnets F, F' or frame of the machine, while other spark gaps, as at $f$, $f'$ attached or connected to the field magnet in any suitable way complete the arrangement. The blowing out action on the formation of an arc at S, S', when the short-circuiting action occurs is in this case accomplished by the free field of the machine alone, as the gaps S, S' are mounted at those portions of the machine where there is a free magnetic field.

In Fig. 2 the arrangement is modified to suit the case of the field magnet system F F', being separately energized and insulated entirely from the armature itself, or from the frame work of the machine. In this case it is manifest that the field magnets are separated from the line altogether and from the framework of the machine. The insulation of the armature wire would, however, be menaced by the reception of any static discharge, and its conveyance by the line $a$, $b$, to the armature winding, because such discharge might easily leap to the core of the armature or the shaft or supports and destroy the machine. In this case the armature shaft or the boxes upholding the same are connected to the discharge plates of the gaps S, S', which are not connected to the line $a, b$, the other discharge plates being so connected to the line as to leave short discharge spaces or gaps which will allow the static discharges to reach the armature core without passing through its insulation. In addition, a spark gap bridging the line as at $S^2$ may be provided, with suitable blow-out or arc-rupturing arrangements as at M, for equalizing large differences of potential between the two sides of the line $a\ b$, in case such difference exists.

Fig. 3 shows a method which I may employ for separating the plates of the arrester or spark gaps. Therein L is a pivoted arm acting as an armature to the electro magnet D connected between the main and ground in the manner shown, that is, to the pivoted arm L, a spark gap $d'$ is placed in multiple with the magnet to avoid the opposition by self-induction of its coils. The operation will be readily understood; the discharge passes both through the magnet and the gap $d'$ to the arm L and the plates S, energizing the magnet in its course; the arm L being attracted by the magnet separates the plates and breaks any arc which the line current may have established there.

While I have described my invention more particularly in connection with dynamo-electric machines or motors, it is obvious that it is applicable to any apparatus comprising two or more parts insulated from each other, one of such parts being in connection with a supply circuit exposed to high tension discharges.

What I claim as new, and desire to secure by Letters Patent, is—

1. The combination with a line circuit, and a dynamo electric machine or motor having its winding or coils connected thereto and its core or body portion insulated therefrom, of a connection including a spark gap between such line and core, such spark gap being placed in the magnetic field of the motor or dynamo electric machine.

2. The combination with a line circuit, of a dynamo electric machine, having its coils connected therewith, and its core insulated therefrom, of a connection between said line and core, a pair of separable spark plates included in said connection and located in the free magnetic field of the machine, and an electro magnet responding to a discharge through said connection and operating to separate said plates, substantially as described.

In witness whereof I have hereunto set my hand this 22d day of August, 1891.

ELIHU THOMSON.

Witnesses:
JOHN W. GIBBONEY,
BENJAMIN B. HULL.